Patented Aug. 4, 1953

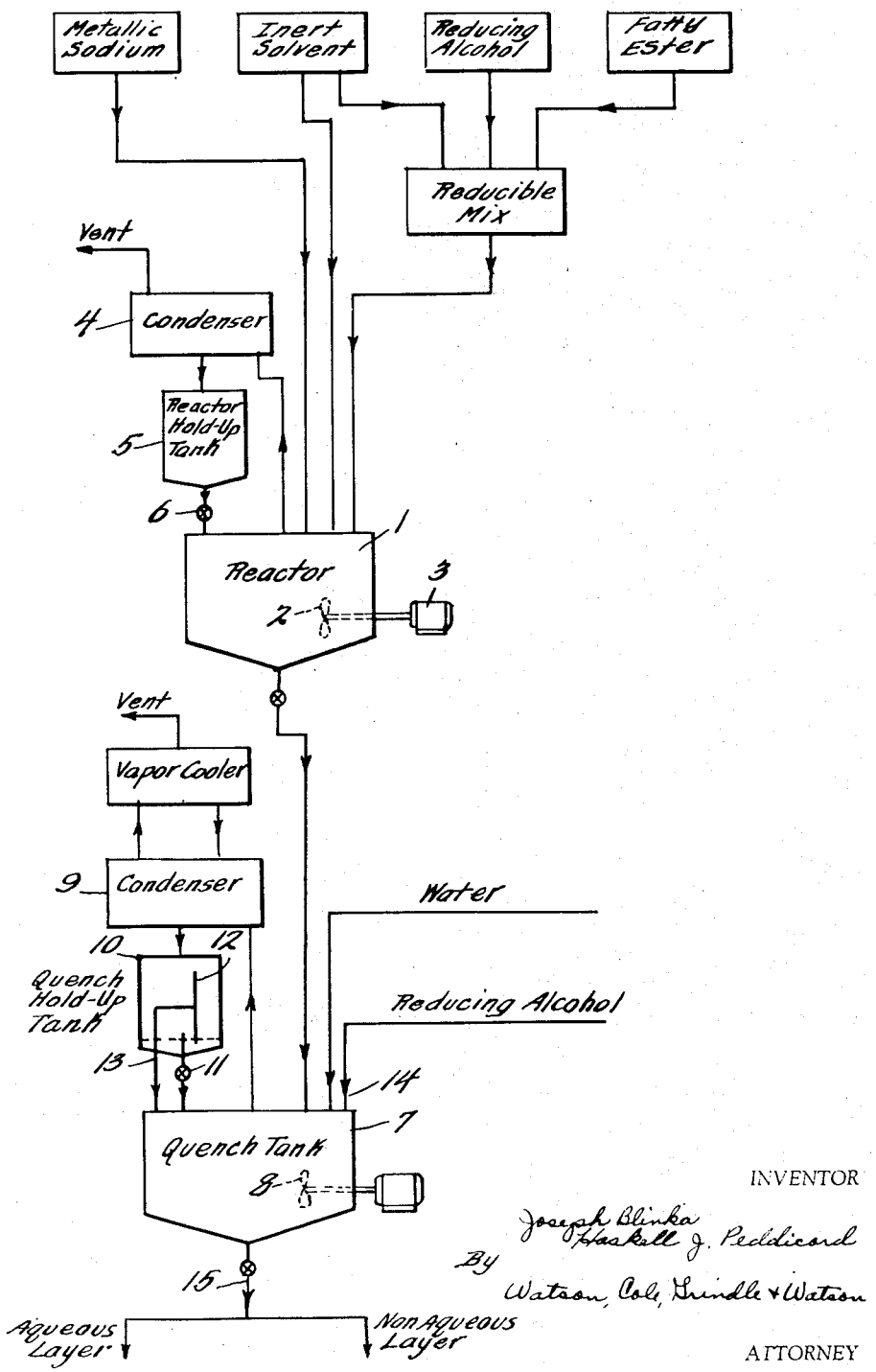

2,647,932

UNITED STATES PATENT OFFICE 2,647,932

PROCESS FOR THE REDUCTION OF FATTY ESTERS

Joseph Blinka, Wyoming, and Haskell J. Peddicord, Deer Park, Ohio, assignors to The Procter & Gamble Company, Ivorydale, Ohio, a corporation of Ohio Application August 18, 1950, Serial No. 180,222

13 Claims. (Cl. 260—638)

This invention relates to improvements in methods for reducing fatty esters. It relates particularly to improvements in processes of reducing esters of fatty acids wherein the predominant fatty acids contain from 16 to 22 carbon atoms and the reduction is effected by treatment with alkali metals and reducing alcohols in the presence of an inert solvent, and is concerned with breaking and preventing the formation of water emulsions of the reduction mixture during quenching of the reduction mass.

Bouveault and Blanc first developed the sodium-alcohol reduction process employing ethyl alcohol and sodium to reduce fatty esters of glycerine. Theoretically, their process consisted essentially of the following reactions:

REDUCTION REACTION

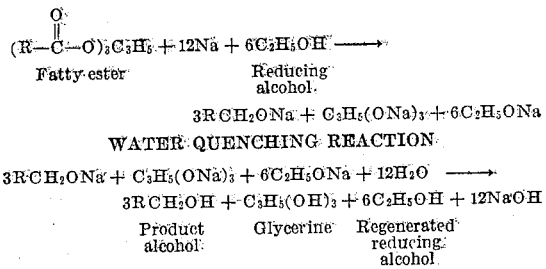

$$3RCH_2ONa + C_3H_5(ONa)_3 + 6C_2H_5ONa$$

WATER QUENCHING REACTION $$3RCH_2ONa + C_3H_5(ONa)_3 + 6C_2H_5ONa + 12H_2O \longrightarrow$$
$$3RCH_2OH + C_3H_5(OH)_3 + 6C_2H_5OH + 12NaOH$$

Product alcohol   Glycerine   Regenerated reducing alcohol

However, their process required large excesses of ethyl alcohol and sodium and so was relatively uneconomical.

Today in an improved process wherein a secondary alcohol, such as secondary butyl alcohol, methyl amyl alcohol and methyl cyclo-hexanol, is used as the reducing alcohol and an inert solvent, such as xylene or toluene, is used to maintain the reduction mixture in a fluid state, such that the reaction proceeds effectively, almost quantitative yields of the product alcohols are obtained, based on the sodium and reducing alcohols employed. Practice, as it existed prior to the present invention, is described in an article entitled "Alcohols by Sodium Reduction" in Industrial & Engineering Chemistry, 41, 438 (1949).

Although the improved process has performed very well for the reduction of relatively low molecular weight fats such as coconut and palm kernel oil to alcohols, much trouble has been encountered in the quenching operation when the process has been applied to the reduction of higher molecular weight fats such as tallow and palm oil. Viscous stable emulsions have been formed that prevent proper reaction of the water with the sodium alcoholates and greatly interfere with the separation of the aqueous and non-aqueous phases.

Objects of this invention are to provide methods for breaking such emulsions and to provide processes in which the formation of such emulsions is avoided.

Another object is to provide more economical methods for carrying out the sodium reduction process.

Other objects and advantages of this invention will be apparent during the course of the following description.

We have discovered that emulsions in water quenched reduction mixtures, that are encountered when the improved process of our invention is not employed, can be avoided or broken by increasing the ratio of reducing alcohol to inert solvent in the mixture to a point where such emulsions are not stable, and when it is desirable, this can be accomplished without increasing the amount of reducing alcohol present.

Various methods of utilizing the improved process of our invention will be apparent during the course of the following description.

A preferred arrangement of apparatus for use in the practice of the invention is illustrated in the accompanying drawing, in which the single figure is a schematic showing or flow chart illustrating further the several steps of the preferred process.

The reduction of fatty esters may be effected by dispersing alkali metal in an inert solvent in the reactor (or prior to addition of the mixture to the reactor), maintaining the alkali metal in dispersed (preferably molten) condition, and slowly adding the reducible mixture consisting of the reducible fatty esters, reducing alcohol in amount substantially chemically equivalent to that required to reduce the combined fatty acids in the fatty esters to fatty alcohols in the present reaction, and an additional amount of inert solvent sufficient to maintain the reaction mixture in a fluid state, such that the reduction proceeds rapidly and almost quantitatively. The reducible mixture is added at a rate such that only a low concentration of unreacted esters is present in the reactor at any time so as to avoid undesirable side reactions between the alkali metal and the esters. Upon completion of the reduction reaction, the reaction mixture is quenched in water, hydrolyzing the various alcoholates to form the corresponding alcohols and alkali metal hydroxide. Both the reduction and overall quenching reactions are highly exothermic. Since the removal of heat through the walls of the containing vessels is unsatisfactory, we prefer to remove the heat by refluxing the volatile materials. In the process illustrated in the figure, the respective heats of reactions are dissipated by evaporation of these volatile materials, the vapors are condensed in surface condensers and the condensates are returned through the hold-up tanks to the respective reaction mixtures.

Two physical phases are formed during the quenching operation, i. e. an aqueous phase and non-aqueous phase. In the reduction of coconut and palm kernel oils to produce fatty alcohols, the aqueous phase, which contains the glycerine and alkali metal hydroxide, separates readily from the non-aqueous phase containing the product alcohols, the reducing alcohols, the inert solvent and a minor amount of alkali metal soaps of fatty acids, leaving only a small amount of an emulsion of the two phases at their interface. However, in the reduction of higher molecular weight fats or mixtures thereof, such as a hydrogenated mixture of about 25% or less of coconut oil and about 75% or more of tallow, very stable emulsions are formed when the reduction mass is quenched and these emulsions do not break, in spite of many hours settling, when the process of our invention is not employed.

The application of our invention, namely, that of increasing the ratio of reducing alcohol to inert solvent to a point where emulsions are broken or are not formed, after the reduction reaction is substantially completed, not only has the advantage of eliminating these troublesome emulsions, but it has the added advantage that it can be accomplished without any loss in completeness of the reduction reaction. Other advantages of the process will be apparent in the course of the following description.

The following methods illustrate various ways of applying the concept of our invention:

1—Removal and withholding of inert solvent from the quenched mixture.

2—Method #1 accompanied by addition of reducing alcohol to emulsified quenched reduction mixtures.

3—Method #1 preceded by addition of reducing alcohol to the reduction mixture after the reduction is completed.

4—Method #1 in addition to removal of inert solvent from the reduction reaction mixture after the reduction is substantially completed.

5—Combinations of #2, #3, or #4.

In carrying out Method #1, namely that of removing inert solvent from the quench mixture, it is desirable to first select a combination of inert solvents and reducing alcohols such that effective separation and recovery of these materials from each other and from the product alcohol can be obtained, through fractional distillation, for further reuse in subsequent reductions. Recovery of inert solvent relatively free of alcohols is particularly desirable because any alcohol present in the recovered inert solvent used in the dispersion of alkali metal thereafter results in a loss of alkali metal equivalent to the alcohol present, since the molecular hydrogen liberated is of no value in the subsequent reduction reaction. The following table illustrates a desirable combination of solvent and reducing alcohols.

| | Approximate boiling point, °F. |
|---|---|
| Inert solvent—xylene | 285 |
| Reducing alcohol—methyl cyclo-hexanol | 340 |
| Product alcohol lowest boiling fraction—myristyl alcohol | 545 |

Satisfactory separation by fractional distillation can be effected in the above combination wherein xylene boils about 55° F. below methyl cyclohexanol and the latter boils about 200° F. below myristyl alcohol, the lowest boiling fraction in the product alcohols obtained from the reduction of beef tallow.

Inert solvents, such as xylene or toluene, in mixtures with water usually boil below the boiling point of water. By use of combinations such as the above, inert solvent and water vapors arising from the quench mixture during the quenching and subsequent boiling period are liquified in the condenser and collected in the quench hold-up tank. Here the water is separated by gravity from the inert solvent and if desired is allowed to flow back into the quench tank through a water take-off line, leaving the inert solvent in the hold-up tank. It is usually advantageous to provide for this automatic return of the water since it keeps the alkalinity of the aqueous phase low and assists in breaking the emulsion. By collecting inert solvent in the hold-up tank the ratio of reducing alcohol to inert solvent in the quench mixture is raised until the emulsion breaks and the aqueous phase separates rapidly from the non-aqueous phase after the boiling and agitation are ceased.

We have found that the ratio of reducing alcohol to inert solvent in the quenched mixture that is necessary to avoid or break emulsions is not a constant value. This ratio which we shall call the RA/IS ratio may shift considerably with other factors such as completeness of the reduction reaction, water usage and changes produced therewith, such as soap and alkali content in the quenched mixture. However, in each instance, the emulsions can always be avoided or broken by raising the RA/IS ratio. Usually we find that the emulsions are broken at a RA/IS ratio of 10/1, and indeed, some emulsions can be broken at ratios as low as 1.7/1; however, we also have used higher ratios, particularly when highly alkaline aqueous phases were involved. Such higher ratios can be attained by prolonged boiling; however, in some cases, time can be saved by using the combination method #2 wherein the removal of inert solvent is supplemented by the addition of reducing alcohol to the quench mixture to raise the RA/IS ratio. In those cases where very stable emulsions are anticipated, it is often advantageous to add the reducing alcohol to the reacted reduction mixture as in Method #3 before the mixture is quenched.

Generally we prefer to employ Method #4, wherein inert solvent is removed from both the reduction reaction mixture and the quench mixture. This method not only provides for the required rise in RA/IS ratio but has the advantage that the inert solvent collected in the reactor hold-up tank is anhydrous and free from reducing alcohol, and therefore is particularly valuable for use in preparing the alkali metal-inert solvent mix for the succeeding batch. This Method #4, thus, has the economic advantage of reducing the amount of fractional distillation capacity needed for recovery of inert solvent. It also provides a further advantage in that the removal of inert solvent from both the reduction and quench mixtures permits larger amounts of fatty ester to be reduced per batch, thereby reducing operating costs.

Method #4, in the case of extremely stable emulsions, also can be supplemented by the addition of reducing alcohol to the quench mixture or to the reacted reduction mixture.

The reduction according to Method #4 may be effected in the manner illustrated in the flow chart of the figure, wherein the alkali metal, in this case molten sodium, is added to a quantity of inert solvent, in the reactor 1, sufficient in amount to maintain the sodium in a dispersed condition preferably at or above its melting point. While the sodium-inert solvent mixture is agitated with a mixer 2 which may be driven by a motor 3, a reducible mixture is added, which contains the fatty ester to be reduced, reducing alcohol in approximately chemically equivalent amount as indicated by the above reduction reaction, and additional inert solvent that may be required to maintain a low viscosity in the reaction mixture such that the reduction proceeds rapidly. The heat developed by the reduction reaction causes inert solvent vapors to evolve from the mixture, pass into the condenser 4 where the vapors are condensed, and return to the reactor 1 by way of the reactor hold-up tank 5. The addition of the reducible mixture is regulated to a rate such that the vapors produced by the heat of the reduction reaction will be completely condensed by the condenser 4. During the later part of the addition of the reducible mixture when the reduction reaction is substantially completed, the valve 6 at the bottom of the hold-up tank 5 is closed, thus allowing the inert solvent vapor condensate to accumulate in the hold-up tank, where it is retained and used to slurry sodium for the next cycle. The reacted reduction mixture is dropped into water in the quench tank 7, where the quench mixture is stirred with an agitator 8. Emulsions in the quench mixture may be eliminated as follows: In addition to the heat developed by the quenching reactions, additional heat is supplied sufficient to boil the mixture. The quench mixture vapors pass into the condenser 9, are condensed, and proceed into the quench hold-up tank 10. With the valve 11 under the quench hold-up tank closed, the condensate which consists primarily of water and inert solvent accumulates in the quench hold-up tank. This removal of inert solvent from the quench mixture is sufficient to break most emulsions. However, it often is desirable to return the water which separates from the inert solvent in the quench hold-up tank to the quench mixture. This return of water can be effected by allowing the condensate to accumulate to a depth sufficient to force the water in the hold-up tank up into the right hand leg 12 of the water draw-off line and cause it to spill over into the left hand leg 13 and return to the quench tank 7. A pipe line 14 is also shown whereby reducing alcohol may be added to the quench mixture when desired. When the RA/IS ratio is sufficiently high to make the emulsion unstable, boiling and agitation are stopped and the aqueous layer settles to the bottom. The inert solvent in the quench hold-up tank 10 may be dropped into the separated quench mass at this point, or it may be dropped after the aqueous layer has been removed from the quench tank 7 through the draw-off line 15.

The invention is further illustrated by the following examples wherein all parts or percentages are on a weight basis unless otherwise indicated.

The following example represents an application of Method #4 wherein the water that collected with the inert solvent in the quench hold-up tank was not allowed to return to the quench mixture.

*Example 1.*—35 parts of sodium metal were dispersed in 100 parts of toluene, having a temperature of about 225° F., in a closed reactor equipped with a reflux condenser and a hold-up tank as illustrated in the accompanying flow chart. While the sodium slurry was being continuously stirred, a reducible liquid mixture composed of 67 parts of toluene, 109 parts of hydrogenated beef tallow having an iodine value of 1 and a saponification value of 196, and 82 parts of a commercial grade of methyl amyl alcohol (4-methyl-2-pentanol) having a hydroxyl value of 520 (said amounts of amyl alcohol and sodium being chemically equivalent to that required for reduction of the combined fatty acids of the tallow to fatty alcohols) was added over a period of 1 hour and 17 minutes, the temperature being not allowed to exceed 264° F. After 80% of the reducible mix had been added, the return valve at the bottom of the reactor hold-up tank was closed, and 100 parts of the toluene returning from the condenser were collected in the reactor hold-up tank. After the reduction was completed, the reacted mixture was stirred, over a period of 20 minutes, into 375 parts of slightly alkaline water in the quench tank. Even though the toluene removed from the reaction mixture resulted in an RA/IS ratio in the quenched mixture of about 1.2/1, a very stable emulsion was formed. The mixture was boiled for 25 minutes during which time 80 parts of a mixture of 19 parts of water, 61 parts of toluene and a minor amount of methyl amyl alcohol was evaporated, condensed, and held up in the quench hold-up tank. At this point the RA/IS ratio in the quenched mixture was of the order of 12/1 to 13/1, the resultant effect being that the mixture separated readily, after the boiling and agitation were discontinued, into a lower aqueous layer containing glycerine and about 16% NaOH, and an upper layer containing the product alcohols, methyl amyl alcohol, toluene and about 1.1% of sodium soap.

The following example is a typical application of the preferred Method #4 wherein the water collected with the inert solvent in the quench hold-up tank was returned to the quench mixture.

*Example 2.*—200 parts of molten sodium were mixed into 300 parts of toluene at a temperature of about 220° F. in a closed reactor equipped with a reflux condenser and a hold-up tank as illustrated in the accompanying flow chart. While the sodium slurry was being continuously stirred, a liquid reducible mixture composed of 345 parts of toluene, 469 parts of a commercial grade of methyl amyl alcohol having a hydroxyl value of 520, and 588 parts of a mixture of fatty glycerides composed of 9 parts of coconut oil and 579 parts of beef tallow (the fatty glyceride mixture having a saponification value of 200 and having been previously hydrogenated to a final iodine value of 1) was added slowly while maintaining the temperature slightly below 260° F. After approximately 90% of the reducible mixture had been added, the return valve at the bottom of the reactor hold-up tank was closed and 300 parts of toluene returning from the reflux condenser were collected in the reactor hold-up tank. After the reduction was completed, the reacted mixture was slowly stirred into 1320 parts of water in the quench tank. The emulsified quench mixture was then boiled for 11 minutes. Throughout the quenching and boiling period, the vapors emitted from the mixture in the quench tank were allowed to pass into the condenser connected therewith and the condensate drained into the quench hold-up tank. The water which separated from the non-aqueous condensate in the quench hold-up tank was returned to the quench tank through the water take-off line. During this period approximately 265 parts of toluene and 10 parts of methyl amyl alcohol collected in the quench hold-up tank. After the cessation of the boiling and agitation, the quenched mixture which now contained methyl amyl alcohol and toluene in the ratio of about 5/1 rapidly separated into two layers, with only a thin emulsified film persisting between the lower aqueous layer containing glycerine and 22% sodium hydroxide, and the upper layer containing the product alcohols, methyl amyl alcohol, toluene and about 1.5% soap.

We have found that in reduction reactions conducted in the manner described above, wherein essentially theoretic amounts of sodium and reducing alcohol required to reduce the combined fatty acids in the esters to alcohols are employed, during the reduction, and the reducing alcohol is essentially completely transformed to the sodium alcoholate form, that the amount of inert solvent removed during the reduction reaction should be limited to an amount such that the total alkoxide (sodium alcoholates including sodium glycerate) concentration does not exceed a range of about 70 to 80%, so as to avoid undesirably high viscosities in the reduction reaction. These maximum alkoxide concentrations will vary somewhat with the reducing alcohol and inert solvent used, and will usually be highest at temperatures near the boiling point of the solvent; typical examples of such maximum concentrations are:

| Solvent | Alcohol | Alkoxide Concentration [1] |
|---|---|---|
| xylene | methyl cyclo-hexanol | about 74%. |
| toluene | methyl amyl alcohol | about 80%. |
| xylene | do | Do. |

[1] The alkoxide contents of the reduction mixtures are considered to be equal to the weight of the sodium, reducing alcohol and fatty ester.

The following example illustrates Method #4 supplemented by the addition of reducing alcohol to the quench mixture.

*Example 3.*—300 parts of sodium metal were dispersed in 530 parts of toluene, having a temperature of about 225° F. in a closed reactor equipped with a reflux condenser and a hold-up tank as illustrated in the accompanying flow chart. While the sodium slurry was continuously stirred, a reducible liquid mixture composed of 428 parts of toluene, 704 parts of a commercial grade of methyl amyl alcohol having a hydroxyl value of 520, and 930 parts of beef tallow having an iodine value of 1 and a saponification value of 197 was added over a period of 48 minutes, the temperature being not allowed to exceed 242° F. After about 65% of the reducible mixture had been added, the return valve at the bottom of the reactor hold-up tank was closed, and 204 parts of the toluene returning from the condenser were separated and held up in the reactor hold-up tank. After the reduction was completed the reacted mixture was stirred, over a period of 2 minutes, into 3000 parts of water in the quench tank. A very stable emulsion was formed that would not split even though the mixture was boiled for 2 hours, during which period 231 parts of water and 1000 parts of inert solvent containing about 28% of methyl amyl alcohol were distilled off and collected in the quench hold-up tank, leaving an RA/IS ratio in the quench mixture on the order of about 12/1. At this point 480 parts of methyl amyl alcohol were mixed into the quench mixture, raising the RA/IS ratio to about 27/1 and the mixture separated readily, into a lower aqueous layer containing glycerine and about 17% NaOH, and an upper layer containing the product alcohols, methyl amyl alcohol, toluene and about 4.8% of sodium soap. Only a very thin film of emulsion remained at the interface of the two surfaces.

This thin film is usually pumped off separately and allowed to re-settle. It has been our experience that the amount of the thin emulsified layer obtained in the reduction of the higher molecular weight fatty esters according to our improved process is actually less than is obtained in the reduction of lower molecular weight fatty esters which are not processed according to our invention.

Throughout the process of each of the above examples, all inflammable mixtures were blanketed with nitrogen.

Since the increase in the RA/IS ratio of the quench mixture is usually most economically effected by distilling inert solvent from the quench mixture, it is preferred to select inert solvents such that their mixtures with water will boil sufficiently far below the reducing alcohol-water mixture to produce the desired increase in the RA/IS ratio of the quench mixture during the quenching and boiling operations. (Boiling points of many such mixtures are to be found in "Table of Azeotropes and Non-azeotropes" by L. H. Horsley, Analytical Chemistry, 19, 508–600 (1947)). Thus, in Example 3, toluene forms an azeotrope with water that boils at about 183° F., and the water azeotrope of methyl amyl alcohol boils in the neighborhood of 205° F. This spread of 22° F. in the boiling points is sufficient to produce a very marked increase in the RA/IS ratio of the quench mixture during the boiling operation. Likewise a similar spread in the boiling points of methyl cyclo-hexanol and xylene enables one to effect a similar removal of xylene from an aqueous mixture of these materials. Usually we prefer to select inert solvents that have a boiling point at atmospheric pressure that is not lower than the melting point of sodium; however, the reaction can be carried out with sodium below its melting point with somewhat lower yields.

Lower boiling solvents can also be used by operating the reduction reaction at superatmospheric pressures. Thus, for example, benzene which boils at 176° F. at atmospheric pressure can be employed as an inert solvent in sodium reductions if the reduction reaction is performed at a pressure of about 2 atmospheres or higher. Low boiling solvents can also be employed to advantage by using lower melting alkali metals in place of sodium, e. g. cesium, potassium and rubidium, or certain low-melting alkali metal alloys of sodium. (Although lithium can also be used in the process we prefer to use sodium and the lower melting alkali metals.)

In general, we prefer to use toluene or xylene as solvents because of their availability, excellent solvent properties and low cost, but other hydrocarbons, e. g. the higher homologues of toluene and xylene, the various isomeric forms of decane, nonane, octane, heptane, and hexane and their higher homologues, can be employed in place of toluene in the above examples with substantially the same results and advantages by making appropriate changes in reducing alcohol, alkali metal, temperatures, pressures and concentrations. Inert solvents other than the aromatic and aliphatic hydrocarbons can be used in this process. Thus for example, it is known that tertiary amines and ethers that are substantially inert to sodium are effective solvents for alkali metal reductions, typical examples being dialkyl ethers, dialkyl glycol ethers, trialkyl glycerol ethers, glycol formal, glycerol formal, tetraalkyl pentaerythrites, etc.

The term "reducing alcohol" in the present specification and claims is understood to mean aliphatic and alicyclic alcohols. These can be branched chain or straight chain monohydric alcohols containing preferably four or more carbon atoms. As has been stated before, the boiling point of the reducing alcohol should usually be such that effective separation from the product alcohols can be effected by distillation. However, in some instances, as for example, in the reduction of a single fatty acid in the form of an ester, it is advantageous to use a reducing alcohol that is the same as an alcohol liberated or produced by the reduction reaction. Generally, we prefer to use secondary alcohols such as methyl isobutyl carbinol, cyclohexanol, methyl cyclo-hexanol, ethyl methyl carbinol and amyl methyl carbinol, although the tertiary alcohols, such as tertiary butyl and tertiary amyl alcohol can also be used with good results. While primary alcohols are usable as reducing alcohols, we do not normally employ them since they are not as satisfactory as the secondary and tertiary alcohols.

In each of the above examples substantially the same results are obtained in the reduction of esters of soap-making fatty acids generally having a materially higher range of molecular weight than that of coconut oil or palm kernel oil. Although the process of this invention can also be used in the reduction of esters such as coconut oil and palm kernel oil, it is particularly designed for the reduction of esters of fatty acids wherein stable emulsions are produced during the quenching operation, when the process is not carried out in accordance with our invention. In general, esters that exhibit such emulsifying tendencies are those esters that contain predominantly fatty acids of from 16 to 22 carbon atoms typical of which are vegetable oils such as palm oil and soybean oil, animal fats such as hog lard and beef tallow, and marine oils, either in the hydrogenated or unhydrogenated state and mixtures of such esters containing up to about one fourth of their weight of fatty esters such as are found in coconut oil. Thus, the invention is particularly applicable to esters of mixed fatty acids containing from 16 to 22 carbon atoms and similar mixtures in which not more than about 20% by weight of the fatty acids contain less than 16 carbon atoms.

It is to be understood that the foregoing more particularly described processes for eliminating emulsions during the quenching operation are to be considered as illustrative of the preferred methods of providing high RA/IS ratios in the quenched mixture; such changes and modifications therein are contemplated as would normally occur to those skilled in the arts to which the invention relates.

Having thus described our invention, what we claim and desire to secure by Letters Patent is:

1. In the process of preparing fatty alcohols, from fatty esters in which the esters of fatty acids containing from 16 to 22 carbon atoms predominate, by reacting the fatty esters with alkali metal and a reducing alcohol containing at least 4 carbon atoms, both in amounts substantially chemically equivalent to that required for said reaction, in the presence of a solvent that is chemically inert in said reaction and in amount at least sufficient to maintain the reaction mixture in a fluid state, said reducing alcohol and inert solvent being soluble in the hereinafter mentioned non-aqueous phase and substantially insoluble in the hereinafter mentioned aqueous phase, and quenching the reacted mixture in water; wherein stable emulsions are ordinarily formed during the quenching operation, the combination of steps which comprises as step (1)—increasing the residual weight ratio of reducing alcohol to inert solvent in the quench mixture to a value which is greater than 1.7/1 and at which said emulsions are unstable, said step 1 including removing and withholding inert solvent from the quench mixture, and step (2)—separating the aqueous phase in the quench mixture from the non-aqueous phase.

2. The process of claim 1 wherein inert solvent is also removed and withheld from the reduction reaction mixture after the reduction reaction is substantially complete but prior to the quenching operation, the amount of solvent withheld from the reduction reaction mixture being less than that which would cause the alkoxide content thereof to exceed approximately 80% by weight.

3. The process of claim 1 wherein reducing alcohol is added to the reacted reduction mixture.

4. The process of claim 1 wherein reducing alcohol is added to the quench mixture.

5. The process of claim 2 wherein reducing alcohol is added to the quench mixture.

6. The process of claim 2 wherein reducing alcohol is added to the reacted reduction mixture.

7. The process of claim 5 wherein reducing alcohol is added to the reacted reduction mixture.

8. The process of claim 2 wherein the fatty esters are derived from tallow.

9. The process of claim 2 wherein the fatty esters are derived from palm oil.

10. The process of claim 2 wherein the fatty esters are derived from hydrogenated vegetable oils.

11. In the preparation of fatty alcohols, from fatty esters in which the esters of fatty acids containing from 16 to 22 carbon atoms predominate, wherein stable emulsions are otherwise formed during the quenching operation, the improved process comprising the steps of reacting the fatty esters with metallic sodium and methyl amyl alcohol, both in amounts substantially chemically equivalent to that required for said reaction, in the presence of toluene in amount at least sufficient to maintain the reaction mixture in a fluid state; reducing the toluene content of the reduction mixture after the reduction is substantially completed to a point such that the total alkoxide concentration does not exceed 80%; quenching the reacted reduction mixture in water; removing and withholding toluene from the quench mixture until the residual weight ratio of methyl amyl alcohol to toluene in the quench mixture is above 1.7/1 and until the emulsion in the quench mixture becomes unstable; and separating the aqueous phase from the non-aqueous phase.

12. In the process of preparing fatty alcohols, from fatty esters in which the esters of fatty acids containing from 16 to 22 carbon atoms predominate, by reacting the fatty esters with sodium and methyl amyl alcohol, both in amounts substantially chemically equivalent to that required for said reaction, in the presence of toluene in amount sufficient to maintain the reaction in a fluid state, and quenching the reacted mixture (containing not more than 80% of total alkoxide) in water wherein stable emulsions are otherwise formed during the quenching operation, the steps which comprise removing and withholding inert solvent from the quench mixture until the residual weight ratio of reducing alcohol to inert solvent in said mixture is above 1.7/1; and separating the aqueous phase in the quench mixture from the non-aqueous phase.

13. The process of claim 12 wherein the fatty esters are those found in tallow.

JOSEPH BLINKA.
HASKELL J. PEDDICORD.

References Cited in the file of this patent

UNITED STATES PATENTS

| Number | Name | Date |
|---|---|---|
| 1,814,654 | Youtz | July 14, 1931 |
| 2,104,803 | Henke et al. | Jan. 11, 1938 |

OTHER REFERENCES

Kastens et al., "Alcohols by Sodium Reduction," vol. 41, pp. 438–46. Industrial and Engineering Chemistry.